(12) United States Patent
Atig

(10) Patent No.: US 8,140,433 B2
(45) Date of Patent: Mar. 20, 2012

(54) METHOD FOR MAKING SECURE TRANSACTIONS CARRIED OUT WITH CARDS PROVIDED WITH AN OWNER IDENTIFICATION NUMBER

(76) Inventor: Sami Atig, Paris (FR)

( * ) Notice: Subject to any disclaimer, the term of this patent is extended or adjusted under 35 U.S.C. 154(b) by 3114 days.

(21) Appl. No.: 10/297,722

(22) PCT Filed: Jun. 8, 2001

(86) PCT No.: PCT/FR01/01772
§ 371 (c)(1),
(2), (4) Date: Nov. 3, 2003

(87) PCT Pub. No.: WO01/95272
PCT Pub. Date: Dec. 13, 2001

(65) Prior Publication Data
US 2004/0068469 A1    Apr. 8, 2004

(30) Foreign Application Priority Data

Jun. 9, 2000    (FR) ...................................... 00 07393

(51) Int. Cl.
*G06Q 40/00* (2006.01)
(52) U.S. Cl. ......... 705/42; 705/35; 705/36 T; 705/36 R; 705/37; 705/38; 705/39; 705/40; 705/41
(58) Field of Classification Search .................... 705/42, 705/35–41
See application file for complete search history.

(56) References Cited

U.S. PATENT DOCUMENTS 5,239,583 A * 8/1993 Parrillo ........................... 705/72
* cited by examiner

*Primary Examiner* — Daniel Felten
(74) *Attorney, Agent, or Firm* — William H. Holt

(57) ABSTRACT

The invention concerns a method for carrying out a transaction comprising prior steps of identifying the card by reading its number and authenticating the bearer optionally by writing in the secret code using a keyboard. The invention is characterized in that the secret code and/or the card number, comprise(s) in a specific position at least a character modified at each transaction. The modified character(s) (N) of the secret code and/or the card is/are modified in accordance with at least a character of a predetermined parameter.

7 Claims, 1 Drawing Sheet

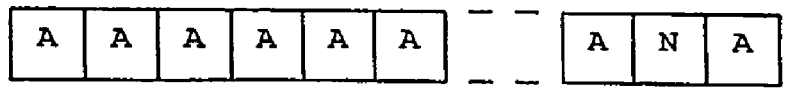

number of the card

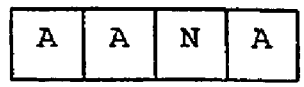

secret code

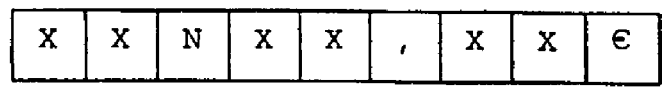

amount of the transaction

| A | A | A | A | A | A | -- -- | A | N | A | number of the card

| A | A | N | A | secret code

| X | X | N | X | X | , | X | X | € | amount of the transaction

METHOD FOR MAKING SECURE TRANSACTIONS CARRIED OUT WITH CARDS PROVIDED WITH AN OWNER IDENTIFICATION NUMBER

This case has been filed as a national phase application of PCT/FR01/01772 filed on Jun. 8, 2001.

The invention concerns a method for securing transactions performed with cards provided with an owner identification number and protected by a secret code for certain operations.

BACKGROUND OF THE INVENTION

Banking or commercial transactions performed with cards, wherein the identification of the user is ensured by a card number and possibly confirmed by a secret code, are commonly used today. These cards can have a chip and/or a magnetic strip or other data storage means. They can even be virtual.

Protection by secret code normally ensures the identification of the user who, theoretically, is the only one who knows this code. But there are transactions in which a secret code cannot be used, particularly in telephone or minitel commerce.

There are several other possible protection methods, including biometrics (fingerprints, the iris of the eye, voice, etc.) but the secret code number is still the easiest to apply and is therefore the one that has been chosen for "consumer" transactions.

Unfortunately, it is still possible for a third party to learn the number of the card, for example during the transaction, when this number has to be communicated, and the secret code can still be detected during its entry, particularly at automated teller machines on the street. As a result, if the card is stolen, it is possible to use it and to perform transactions as long as the theft is not recorded in banks' computers.

SUMMARY OF THE INVENTION

The object of the invention is to eliminate these drawbacks by means of a method that ensures the secrecy of at least one character of the card number and/or at least one character of the secret code by modifying these characters with each transaction.

This object is achieved according to the invention in that the card number and/or the secret code comprise(s), in predetermined positions, at least one character that is modified with each transaction;
the modified character(s) of the card and/or the secret code is/are each modified as a function of at least one character of at least one predetermined parameter.

According to another particular embodiment of the invention, the modifiable character(s) of the card number and/or the secret code are modified as a function of the same character(s) of the predetermined parameter(s). It is possible to modify only one number of the card and/or only one number of the secret code.

This parameter can be furnished by an event, such as the amount of a previous transaction, a transaction date or another date, the identifier of the merchant with which the transaction was performed, or any other event that is random in nature, chosen with the institution handling the transaction.

In the case where said parameter is the amount or the date of a previous transaction, it can be for example the next-to-last transaction.

In order to secure the transaction more effectively, the character(s) of the card number and/or the secret code can be modified by means of a function that acts on the chosen parameter.

In order for the method to be applicable, the user of the card agrees with the institution handling the latter on the following points;
The previous parameter(s) to be used;
The rank of the digit(s) of the parameter derived from the previous event(s) to be used;
The number of characters of the card number to be varied;
The rank of the character(s) of the card number to be varied;
The number of characters of the code that may possibly be varied;
The rank of the character(s) of the secret code that may possibly be varied.

Preferably, in the case where a previous transaction is used as the event that furnishes the parameter, it is the next-to-last transaction.

Indeed, it is easy for a third party present during transactions to learn the amounts of them, particularly in the case of a withdrawal from an automated teller machine. It is more difficult to learn the amount of the transaction performed the time before.

According to a particular characteristic of the invention, a second secret code is used for telecommunications transactions, all the characters of which are changed with each transaction as a function of one or more predetermined parameter (s).

Indeed, it is necessary, in the context of these transactions, to protect oneself against an interception of the transmission of the code. To do this, one uses this second code. The second code is changed after each transaction, even if the latter has not been validated by the institution handling the cards.

BRIEF DESCRIPTION OF THE DRAWING

The FIGURE schematically represents the positions of the characters of a card number and a secret code in an exemplary embodiment of the invention in which a single character of the number and the code is replaced by the same character of a single previous transaction.

DESCRIPTION OF THE PREFERRED EMBODIMENTS

The characters of the card number and the secret code are represented by an A, except for one of them, the variable character, which is represented by an N. The amount of the previous transaction (the event chosen) is represented by Xs, except for one of the characters, which is also represented by an N.

A previous transaction, for example the next-to-last one, involved the sum of 356 €.

By arrangement with the institution handling the card, it is the hundreds digit of this transaction that should be used to replace the variable character of the card and that of the code. Also by arrangement, it is for example the next-to-last character that should be replaced.

The transaction proceeds as follows:
The user of the card inserts his card into the machine recording the transaction. The machine reads the number of the card, except for the next-to-last number, and asks that the latter be re-entered. The user will then type in 3.

The number of the card is therefore now
AAAAA . . . A3A.

The machine then requests the secret code, which is typed in by the user.

AA3A.

The transaction can then be performed.

As a result of the method according to the invention, the holder of the card as well as the institution handling this card are assured that in case of theft, the fraudulent use of the card will be, if not impossible, at least extremely difficult, since the user has to know not only the secret code but, in the case where a previous transaction has been chosen:

the amount of the previous transaction;
the digit or digits of this transaction to be used;
the chronological order of this transaction (last, next-to-last, etc.);
the rank of the character or characters of the code to be replaced.

In order to facilitate the memorization of these digits by a user who makes only withdrawals and small purchases in stores, it is preferable that only one digit be used, as in the example described above, and that it be the same for the card number and for the secret code, when one is used.

In the case according to the preceding example, where the key digit of the next-to-last transaction is the same as that of the last one, it is possible to provide according to the invention for the variable character to be replaced by this digit increased by an agreed-upon FIGURE, for example 1.

Thus, in our example, if the last transaction has the same hundreds digit as the next-to-last one, the variable character will be replaced by a 4 instead of a 3.

It is also possible to provide, according to the invention, for the replacement character(s) to be obtained by means of a function that acts on the chosen characters of the previous events, in order to further secure the operation and facilitate memorization.

Furthermore, in order to facilitate the generation of new numbers and/or codes for the user by means of the function, the latter can be executed in all of the automated machines using the card and in any secure network.

The invention claimed is:

1. A method for performing secure transactions by means of cards provided with an identification number, said transactions including the steps of identifying said card via a telecommunications transaction for communication of said identification number, said transactions being the type in which the identification number of said card comprises, in positions predetermined by arrangement with the institution handling the transactions, at least one character that is modifiable with each of said transactions, and modifying said character as a function of at least one character of at least one predetermined parameter, and being characterized in that said predetermined parameter is an element of at least one event that is random in nature, chosen by agreement with said institution for securing said transaction.

2. Method according to claim 1 characterized in that said function acts on a parameter that depends on the location, the merchant, or the terminal at which said transaction is performed.

3. Method according to claim 1 characterized in that said function acts on at least two parameters, each depending on a different event.

4. Method according to claim 1 characterized in that a step of generating new numbers and/or codes by means of said function can be executed in all automated machines using said card.

5. Method according to claim 1 characterized in that a step of generating new numbers and/or codes by means of said function can be executed in all secure networks.

6. A method as defined in claim 1 including the step of selecting a transaction as said event that is random in nature for facilitating memorization of a user of said card.

7. A method as defined in claim 1 including the step of selecting an identifier of a merchant involved in said transaction as said event that is random in nature for further securing said transaction.

* * * * *